United States Patent
Wesner et al.

(10) Patent No.: US 8,137,515 B2
(45) Date of Patent: Mar. 20, 2012

(54) METHOD FOR THE PRODUCTION OF A DIAMOND ELECTRODE, AND DIAMOND ELECTRODE

(75) Inventors: Wolfgang Wesner, Vienna (AT); Robert Hermann, Oberaich (AT); Michael Schelch, Bruck an der Mur (AT); Wolfgang Staber, Bruck an der Mur (AT)

(73) Assignee: Pro Aqua Diamantelektroden Produktion GmbH & Co. KG (AT)

( * ) Notice: Subject to any disclaimer, the term of this patent is extended or adjusted under 35 U.S.C. 154(b) by 443 days.

(21) Appl. No.: 12/296,464

(22) PCT Filed: Apr. 4, 2007

(86) PCT No.: PCT/EP2007/053337
§ 371 (c)(1),
(2), (4) Date: Aug. 31, 2009

(87) PCT Pub. No.: WO2007/116004
PCT Pub. Date: Oct. 18, 2007

(65) Prior Publication Data
US 2010/0170783 A1    Jul. 8, 2010

(30) Foreign Application Priority Data
Apr. 10, 2006   (AT) .................................. A 620/2006

(51) Int. Cl.
*C25B 11/02* (2006.01)
*C25B 11/04* (2006.01)
*C25B 11/06* (2006.01)
*C25B 11/12* (2006.01)
*H01M 4/04* (2006.01)
*H01M 4/88* (2006.01)
*H01M 4/90* (2006.01)
*H01M 4/96* (2006.01)

(52) U.S. Cl. ....................................... 204/294; 502/101
(58) Field of Classification Search .................. 204/294; 502/101
See application file for complete search history.

(56) References Cited

U.S. PATENT DOCUMENTS

| | | | |
|---|---|---|---|
| 7,438,790 B2 * | 10/2008 | Hosonuma et al. | 204/294 |
| 7,468,121 B2 * | 12/2008 | Hosonuma et al. | 204/290.12 |
| 2006/0151803 A1 * | 7/2006 | Wesner et al. | 257/103 |
| 2007/0051625 A1 * | 3/2007 | Pickles et al. | 204/400 |
| 2008/0271911 A1 * | 11/2008 | Ogure et al. | 174/250 |

FOREIGN PATENT DOCUMENTS

| | | |
|---|---|---|
| AT | 413 109 B | 11/2005 |
| JP | 2005 325417 A | 11/2004 |
| JP | 2005 272908 A | 10/2005 |
| JP | 2005 272910 A | 10/2005 |
| WO | WO 2004/005585 A1 | 1/2004 |
| WO | WO 2005/116298 A1 | 12/2005 |

OTHER PUBLICATIONS

International Search Report dated Jan. 21, 2008, issued in corresponding international application No. PCT/EP2007/053337.

\* cited by examiner

*Primary Examiner* — Bruce Bell
(74) *Attorney, Agent, or Firm* — Ostrolenk Faber LLP

(57) ABSTRACT

A method for producing a diamond electrode comprising synthetically produced and electrically conductive (doped) diamond particles, which are embedded into a support layer of electrically non-conductive material. The doped diamond particles are introduced as a single layer between two films that form the support layer, the films then being permanently connected to each other and the diamond particles being exposed on both sides of the support layer.

25 Claims, 2 Drawing Sheets

METHOD FOR THE PRODUCTION OF A DIAMOND ELECTRODE, AND DIAMOND ELECTRODE

CROSS REFERENCE TO RELATED APPLICATIONS

The present application is a 35 U.S.C. §371 national phase conversion of PCT/EP2007/053337 filed Apr. 4, 2007, which claims priority of Austrian Application No. A 620/2006, filed Apr. 10, 2006 which are incorporated herein in their entirety.

BACKGROUND

1. Field

Disclosed is a method for producing a diamond electrode comprising synthetically produced and electrically conductive (doped) diamond particles which are embedded in a support layer. Also disclosed is a diamond electrode comprising synthetically produced and electrically conductive (doped) diamond particles which are embedded in a support layer.

2. Related Art

Diamond electrodes are distinguished by a high overload for oxygen and hydrogen and are therefore suited for a plurality of oxidation processes in aqueous solution. Possible and particularly interesting applications lie in the field of water treatment by anodic oxidation and in the field of synthesis chemistry.

It is known to produce diamond electrodes by a direct generation of boron-doped diamond layers on substrate materials, in particular by CVD (Chemical Vapor Deposition) methods, for example in accordance with DE 10324558. From EP 1527212 a method for the production of diamond electrodes is known, in which doped, electrically conductive and synthetically produced diamond particles are embedded superficially into a metal or a metal alloy such that a conductive connection results between the metal or the metal alloy and the diamond particles. The diamond particles are mixed with powders of metals or metal alloys, which are capable of forming a non-conducting oxide layer, and are then pressed so that a pressed piece, if necessary with a support plate, is produced, which contains the diamond particles embedded in one or more layers. Low-melting materials, for example magnesium or a magnesium alloy, are proposed as starting materials for the embedding layer, which materials are melted onto a preferably metallic support layer with a higher melting point.

With regard to the prior art, reference is also made to WO 2005116298, which is concerned with the production of plastic diamond electrodes, to JP 2005272908, from which a bipolar diamond electrode is known, and to US 2005200260, which relates to a method in which metal is deposited on diamonds.

Diamond electrodes produced by the CVD method are limited with regard to their size. Larger electrode surfaces tend to the formation of cracks owing to the different coefficients of thermal expansion, which as a further consequence can lead through gas development under the diamond layer to the destruction of the electrode. Therefore, in order to guarantee the durability of the electrode, the diamond layer must have a certain minimum thickness which can only be achieved by a deposition process lasting several hours. The production costs are therefore comparatively high in the case of diamond electrodes which are produced in such a way.

Diamond electrodes produced according to EP 1527212 by the binding of diamond particles to self-passivating metals have a good durability in those media in which the metal oxide is stable under anodic or cathodic conditions. In aqueous solutions with a high halide content, and in organic solutions such as are used in electro-organic synthesis, the durability of such electrodes is somewhat less. In alternating current applications, hydride corrosion impairs the durability of the electrodes.

SUMMARY

To address these problems, the inventors have developed a method for the production of diamond electrodes which are readily durable in aggressive media, and corresponding diamond electrodes produced by the method. Diamond electrodes produced according to the method are especially durable in particular in halogen acids, in salt solutions, brine, sea water and in the organic synthesis with alcoholates.

These advantages are archived by introducing the doped diamond particles as a single layer between two films that form the support layer, the films being then permanently connected to each other, and the diamond particles being exposed on both sides of the support layer.

Diamond electrodes made according to the method are characterized in that the diamond particles are embedded as a single layer into the support layer and are exposed on both sides of the support layer.

Diamond electrodes produced and made according to this method can very readily be made durable, by the choice of the film material, in the aggressive media which were mentioned, such as halogen acids, salt solutions, brine and sea water and in the organic synthesis with alcoholates. Their range of use extends over the entire pH range of 0 to 14. The diamond electrodes are, in addition, largely maintenance-free because by polarity reversal, deposits such as, for instance, lime can be dissolved, so that washing with acid does not have to take place. The diamond electrodes can be used in addition as anode or cathode, and they can be regularly reversed in polarity or operated with alternating current, without the electrodes being damaged by hydride formation.

According to one feature, glass, ceramic, or a plastic, in particular PVDF, PFA, PTFE, FEP, ETFE, PEEK or PPS (polyvinylidenfluoride, perfluoroalkoxy, polytetrafluoroethylene, fluorinated ethylene propylene, ethylene tetrafluoroethylene, polyether ether ketone, or poly(p-phenylene sulphide), respectively, is used as material for the support layer, for the mechanical fixing of the diamond particles. These materials are equally well suited under cathodic and anodic conditions and show no sensitivity to hydride corrosion, oxygen corrosion or other chemical actions.

In another feature, the films between which the doped diamond particles are introduced have a thickness of 5 μm to 300 μm, preferably a thickness of 10 μm to 150 μm. Heating (over melting temperature), welding, soldering, sintering, pressing, rolling or gluing are suitable for example for the connecting of the two films.

In a further feature, to increase the mechanical strength a supporting lattice, supporting gauze or another suitable supporting material is introduced between the two films, before these are permanently connected to each other. In an alternative, the lattice or the gauze can also be fixed after the completion of the diamond electrode by current methods of connection of plastics with plastics or metals, for example by laminating or gluing on one or both sides on the surface of the diamond electrode. Plastics such as PVDF, PFA, PTFE, FEP, ETFE, PEEK or PPS, glass fibres, plastic-coated glass fibres, ceramics or metals such as for example titanium or tantalum, are used as materials for the supporting lattice or supporting gauze.

In a preferred manner, the diamond particles are exposed in the step of heating (melting). An additional, soft material in the form of thin sheets may be placed externally onto the films forming the support layer, into which soft material the diamond particles penetrate by the application of pressure on one or both sides and are therefore exposed. Teflon (PTFE), Viton fluoropolymer elastomer, Kapton polyimide, neoprene, thermoplastic vulcanizate (TPV), fluoropolymerides such as PO (propylene oxide), fluororubbers such as for example FPM (fluorinated propylene monomer) or FKM fluoroelastomers, PEEK, silicones, and also metals such as for example lead, aluminum or copper, are usable as material for these sheets. The thickness of these materials here is 0.2 mm to 3 mm, in a preferred embodiment 0.5 mm to 1.5 mm.

In a further processing step, the diamond particles are exposed on both sides of the support layer, for example mechanically, chemically or thermally. In this way, it can be ensured in any case that the diamond particles are able to be contacted on both sides of the support layer.

A contacting layer can be mounted on the diamond electrode which is produced as described above, which contacting layer makes it permanently possible to supply the diamond particles with current. In particular, graphite, carbon or carbon fibres come into consideration as electrically conductive material. This material can be a powder, a paste or a gauze.

To improve the contact, a conducting salt solution, preferably $Na_2SO_4$, can be used in the contacting layer.

BRIEF DESCRIPTION OF THE DRAWINGS

An exemplary embodiment will now be described in further detail with the aid of the drawings, in which.

DETAILED DESCRIPTION

Figure 1:
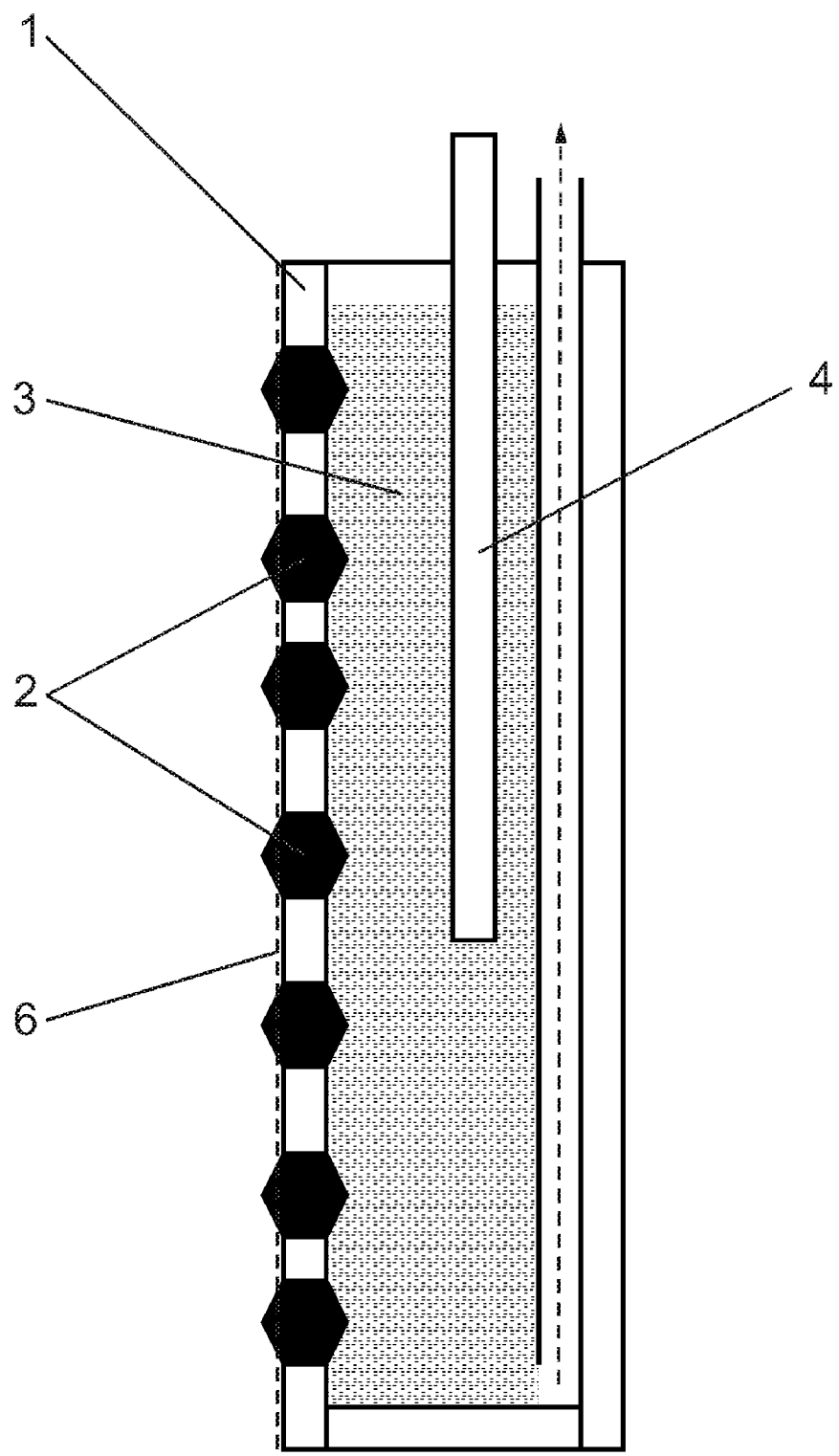
FIG. 1 shows diagrammatically a cross-section through a diamond electrode made and produced as described herein.

The diamond electrode shown in FIG. 1 has a layer of diamond particles 2, which are embedded into a support layer 1. The diamond particles 2 are embedded in the support layer 1 as a single layer without reciprocal contact, such that they protrude somewhat out from the support layer 1 on both sides and are exposed. On the one side of the support layer 1, a contacting layer 3 of an electrically conductive material is applied. The current supply 4 takes place through the contacting layer 3.

Diamond particles 2 of the most varied of shapes and sizes and from different production processes are able to be used for diamond electrodes. Conductive or semi-conducting diamond powder, which has a grain size of 80 μm to 500 μm, in particular up to 300 μm, is particularly suitable. The diamond particles 2 are doped in particular with boron or nitrogen. A preferred starting material for the production of diamond electrodes is industrial diamonds produced by high pressure-high temperature methods and doped with boron, which have a particularly high quota of sp3 carbon.

The support layer 1 serves for the mechanical fixing of the diamond particles 2, in particular in one plane, and includes a material which is inert in the respective application medium under cathodic and anodic conditions, and which is preferably insensitive with respect to hydride corrosion, oxygen corrosion and other chemical actions. Glass, ceramic and chemically stable polymers, for example fluorinated polymers such as PVDF, PFA, PTFE, FEP, ETFE, PEEK or PPS are particularly suitable.

Figure 2:
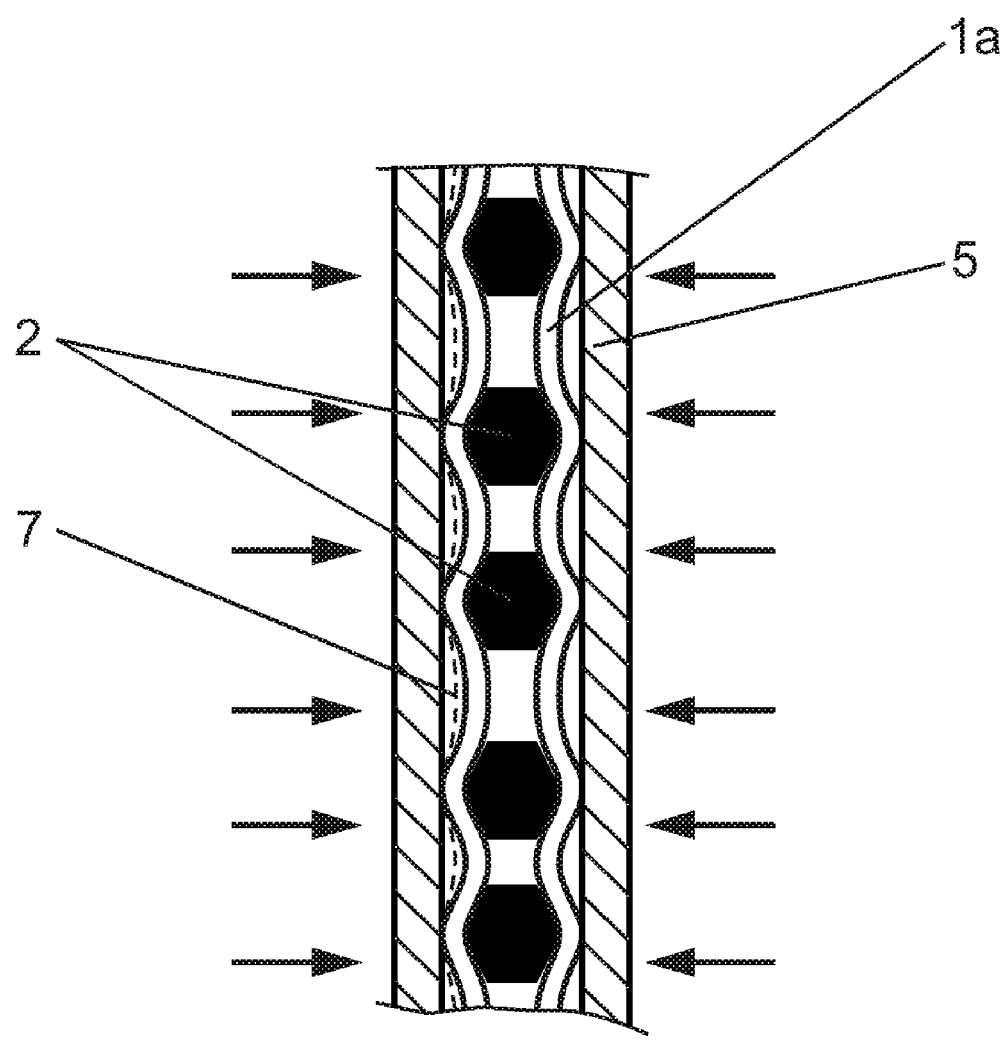
FIG. 2 shows a stage in the process of producing the diamond electrode.

Referring now to FIG. 2, a pair of films 1a preferably form the starting material for the support layer 1. With the use of films, the diamond particles 2 are embedded between two films of the selected material, for example of glass, ceramic or plastic. Then the two films are connected to each other, for example by heating (melting on), welding, soldering, sintering, pressing, rolling or gluing. The films have a thickness of 5 μm to 300 μm, preferably of 10 μm to 150 μm. The raised parts of the diamond particles are exposed on both sides, for example mechanically, chemically or thermally.

It is particularly advantageous to expose the diamond particles by the heating or melting on of the two films 1a that make up the outer sides of the support layer 1. For this, a soft material in the form of thin sheets 5 is applied respectively on the outer sides of the films 1a forming the support layer. By the application of areal pressure—on one or both sides—the diamond particles penetrate through the film material and are thus exposed. Teflon, Viton, Kapton, neoprene, thermoplastic vulcanizates (TPV), fluoropolymerides such as PO, fluororubbers such as for example FPM or FKM, PEEK, silicones, and also metals such as for example lead, aluminum or copper, are examples of preferred materials for the thin sheets. The thickness of the sheets is selected to be between 0.2 mm to 3 mm, and advantageously between 0.5 mm and 1.5 mm. If necessary, a further processing step for completing exposure of the diamond particles mechanically, chemically or thermally can then take place.

To increase the mechanical strength of the diamond electrode, in the production of the diamond electrode a supporting lattice, supporting gauze or another suitable material 7 (FIG. 2) can be introduced between the two films. However, it is also possible to fix a supporting lattice, supporting gauze or another suitable material 6 (FIG. 1) on one of the two, or on both, outer sides after the completion of the diamond electrode. For this, the usual methods for the connection of plastics or metals come into consideration, for example laminating or gluing. Plastics such as PVDF, PFA, PTFE, FEP, ETFE, PEEK or PPF, glass fibres, plastic-coated glass fibres, ceramics or metals such as for example titanium or tantalum are suitable as material for the supporting lattice, supporting gauze or other material 6, 7. The supporting lattice or gauze comprises an open structure allowing the diamond particles to be exposed.

On one side of the support layer 1, a contacting layer 3 can be mounted, which makes it possible to supply the diamond particles 2 permanently with current by way of a current supply conductor 4. Basically, all kinds of conductive materials are suitable for the contacting layer 3. However, it is to be taken into account that a fatigue-durable and fluid-tight integration of the diamond particles 2 into the support layer 1 is scarcely possible. It is not to be ruled out that diamond particles 2, when the electrode is in operation, lose the binding on to the support layer 1 in some places. The occurrences which can cause a detachment are not only chemical in nature here, such as oxidation and corrosion, but also have physical causes. Thus, for example, a development of heat by current flow can lead to a crack formation between the diamond particles 2 and the support layer material. Furthermore, the gas development can cause strong forces on the anodically or cathodically operated diamond electrode, causing a slow weakening of the attachment. After a certain period of operation, the diamond particles 2 are indeed still in their position, but it is possible that fluid penetrates to the contacting layer 3.

In order to ensure a very long durability even in aggressive media, it is therefore important to construct the contacting layer 3 such that despite penetrating fluid and possible corrosion of the material of the contacting layer 3, a permanent contact with the diamond particles 2 is guaranteed. For applications of the diamond electrode in halogen salts, halogen acids and alcoholates under anodic conditions, practically all metallic conductors precipitate as material for the contacting layer 3. Therefore, conductive materials, for example conductive ceramics or plastics, or conductive materials which form no insulating oxides, such as graphite, carbon or carbon fibres, are used for the contacting layer 3.

Conductive carbon forms such as graphite, carbon or carbon fibres are well suited for the contacting layer 3. These materials in fact oxidize in contact with the electrolyte solution under anodic potential, but only form carbon dioxide, which escapes through the material which is more porous, because it is present as a fill of particles or powder, as paste or gauze. The material moves up and provides for a constant contact to the diamond particles. A certain wearing off of carbon must be accepted, which is balanced out by a corresponding reserve of material of the contacting layer. The total amount of current which is directly converted via the contacting (electrolysis) can be disregarded in relation to that supplied to the diamond particles 2.

In order to prevent an excess electrolysis at the contacting layer 3, a dewatering of the contacting layer 3 can be provided, whereby penetrating solution is able to be actively removed at the contacting layer 3. Preferably, this can take place through the gas pressure which occurs as a result of the electrolysis in the contact space which contains the contacting layer 3, via suitable openings indicated schematically by the arrow in FIG. 1.

To connect the contact, the contacting layer 3 can be additionally filled with a conducting salt solution, preferably a $Na_2SO_4$ solution, or can consist of carbon powder mixed with concentrated $Na_2SO_4$.

In order to ensure a moving up of the contacting layer material to the electrode, it is advantageous to press the contacting layer 3 onto the support layer 1 with a constant pressure. This can take place in various ways, for example by a tensioning onto a rear wall, by arrangements with springs, by hydraulic devices and other suitable devices. A further possibility exists in utilizing the gas pressure of electrolysis in the contact space where the contact layer 3 is disposed.

Diamond electrodes made and produced according to the method can also be used as bipolar electrodes incorporated in an electrochemical cell. Such electrochemical cells are used for various areas of use, for example for water and waste water treatment in industrial operations, for purifying water in swimming pools or whirlpools and for the disinfecting of drinking water.

Although particular embodiments have been described, many other variations and modifications and other uses will become apparent to those skilled in the art. Therefore, the present invention is not limited by the specific disclosure herein.

The invention claimed is:

1. A method for producing a diamond electrode comprising synthetically produced and electrically conductive doped diamond particles, which are embedded in a support layer of electrically non-conductive material, comprising the steps of:
   disposing the doped diamond particles between two films;
   permanently connecting the two films to each other to form the support layer; and
   exposing the diamond particles on both sides of the support layer.

2. The method according to claim 1, characterized in that the films contain glass, ceramic or plastic.

3. The method according to claim 2, wherein the films are connected to each other by heating, welding, soldering, sintering, pressing, rolling or gluing.

4. The method according to claim 2, wherein said plastic contains PVDF, PFA, PTFE, FEP, ETFE, PEEK or PPS.

5. The method according to claim 1, further comprising the step of placing soft materials in the form of sheets onto the films; and
   applying pressure on one or both sides of the sheets to expose the diamond particles through the films.

6. The method according to claim 5, wherein said sheets contain PTFE, fluoropolymer elastomer, polyimide, neoprene, thermoplastic vulcanizates (TPV), fluoropolymeride, PO, fluororubber such as FPM or FKM, PEEK, silicone or soft metal.

7. The method according to claim 5, characterized in that the sheets have a thickness of 0.1 mm to 3 mm.

8. The method according to claim 7, wherein the sheets are 0.5 mm to 1.5 mm in thickness.

9. The method according to claim 1, characterized in that the diamond particles are exposed on both sides of the support layer mechanically, chemically or thermally.

10. The method according to claim 1, wherein the films have a thickness of 5 µm to 300 µm.

11. The method according to claim 10, wherein the films are 10 µm to 150 µm in thickness.

12. A method for producing a diamond electrode comprising synthetically produced and electrically conductive doped diamond particles, which are embedded in a support layer of electrically non-conductive material, comprising the steps of:
   disposing the doped diamond particles between two films;
   permanently connecting the two layers to each other to form the support layer; and
   exposing the diamond particles on both sides of the support layer;
   further comprising the step of placing soft materials in the form of sheets onto the films; and
   applying pressure on one or both sides of the sheets to expose the diamond particles through the films;
   wherein said sheets contain a soft metal;
   wherein said soft metal contains lead, aluminum or copper.

13. A method for producing a diamond electrode comprising synthetically produced and electrically conductive doped diamond particles, which are embedded in a support layer of electrically non-conductive material, comprising the steps of:
   disposing the doped diamond particles between two films;
   permanently connecting the two films to each other to form the support layer; and
   exposing the diamond particles on both sides of the support layer;
   wherein a supporting gauze or a supporting lattice is introduced between the two films, before the two films are connected to each other.

14. A method for producing a diamond electrode comprising synthetically produced and electrically conductive doped diamond particles, which are embedded in a support layer of electrically non-conductive material, comprising the steps of:
   disposing the doped diamond particles between two films;
   permanently connecting the two films to each other to form the support layer; and
   exposing the diamond particles on both sides of the support layer;
   wherein a supporting gauze or a supporting lattice is fixed on one or both of the outer sides of the support layer.

15. The method according to claim 13 or claim 14, wherein the support gauze or support lattice is applied by laminating, gluing, melting, welding, pressing or rolling.

16. The method according to claim 13 or claim 14, wherein material for the supporting gauze or supporting lattice is selected from the group consisting of plastics including PVDF, PFA, PTFE, FEP, ETFE, PEEK and PPS, glass fibres, plastic-coated glass fibres, ceramics or metals including titanium or tantalum.

17. A method for producing a diamond electrode comprising synthetically produced and electrically conductive doped diamond particles, which are embedded in a support layer of electrically non-conductive material, comprising the steps of:
   disposing the doped diamond particles between two films;
   permanently connecting the two films to each other to form the support layer; and
   exposing the diamond particles on both sides of the support layer;
   further comprising the step of mounting a contacting layer of electrically conductive material on one side of the support layer, for contacting the diamond particles, said material being a material that neither forms insulating oxides nor dissolves in aggressive media.

18. The method according to claim 17, wherein said electrically conductive material includes graphite, carbon or carbon fibres.

19. A diamond electrode comprising synthetically produced and electrically conductive (doped) diamond particles embedded in a support layer of an electrically non-conductive material, wherein
   the support layer comprises two films that are permanently connected to each other, and
   the diamond particles are embedded between the two films, and exposed on both sides of the support layer.

20. The diamond electrode according to claim 19, wherein the support layer contains glass, ceramic or plastic.

21. The diamond electrode according to claim 20, wherein said plastic comprises PVDF, PFA, PTFE, FEP, ETFE, PEEK or PPS.

22. The diamond electrode according to claim 19, further comprising a supporting gauze or supporting lattice disposed in or on the support layer.

23. The diamond electrode according to claim 22, wherein a material for the supporting gauze or supporting lattice comprises a plastic, such as PVDF, PFA, PTFE, FEP, ETFE, PEEK or PPS, or glass fibres, plastic-coated glass fibres, ceramics or metals such as titanium or tantalum.

24. A diamond electrode comprising synthetically produced and electrically conductive (doped) diamond particles embedded in a support layer of an electrically non-conductive material, wherein
   the support layer comprises two films that are permanently connected to each other, and
   the diamond particles are embedded between the two films, and exposed on both sides of the support layer;
   further comprising a contacting layer of electrically conductive material such as a powder, a paste or a gauze of graphite, carbon or carbon fibres, disposed on the support layer.

25. The diamond electrode according to claim 24, further comprising a conducting salt solution, for example $Na_2SO_4$, in the contacting layer.

* * * * *